United States Patent [19]

Nelson et al.

[11] Patent Number: 5,437,175
[45] Date of Patent: Aug. 1, 1995

[54] DEVICE FOR BENDING COAXIAL CABLE

[75] Inventors: John Nelson, East Stroudsburg; Emil Rolando, Creso, both of Pa.

[73] Assignee: Endeco Corporation, Allentown, Pa.

[21] Appl. No.: 246,200

[22] Filed: May 19, 1994

[51] Int. Cl.6 .............................................. B21D 7/02
[52] U.S. Cl. .................... 72/215; 72/458; 72/214
[58] Field of Search .................. 72/458, 459, 386, 387, 72/388, 389, 214, 215, 216, 217

[56] References Cited

U.S. PATENT DOCUMENTS

| | | | |
|---|---|---|---|
| 1,333 | 9/1839 | Neveil | 72/215 |
| 1,769,570 | 7/1930 | Groehn et al. | 72/217 |
| 2,740,435 | 4/1956 | Pritts | 72/386 |
| 3,824,835 | 7/1974 | Jackson | 72/389 |
| 3,855,838 | 12/1974 | Jackson | 72/389 |
| 4,372,145 | 2/1983 | Giordano et al. | 72/387 |
| 4,569,219 | 2/1986 | Threlkel et al. | 72/381 |

FOREIGN PATENT DOCUMENTS 2244667 12/1991 United Kingdom .................. 72/458

*Primary Examiner*—David Jones
*Attorney, Agent, or Firm*—Kenyon & Kenyon

[57] ABSTRACT

A lightweight and easy-to-operate device for bending expansion loops in coaxial cable includes a bending frame which has on its upper surface pivoted brackets for securing the device to a support cable, so that the device may be slid into position and may be supported by the support cable during operation. The device also includes a pivoted bending handle with a bending shoe, which bending shoe bends and forms the coaxial cable along the profile of an arcuate surface of the frame. The bending handle is easily switched from one end of the frame to the other, to thereby bend both ends of the expansion loop against the arcuate form of the frame.

28 Claims, 4 Drawing Sheets

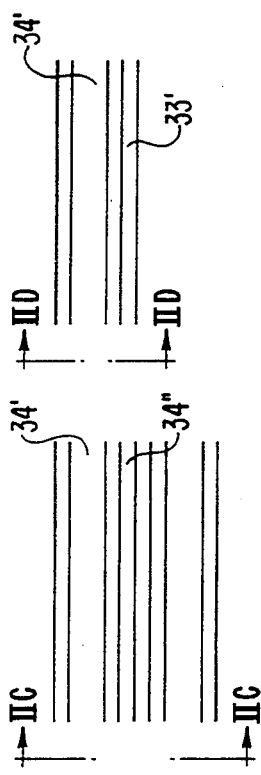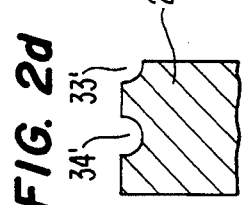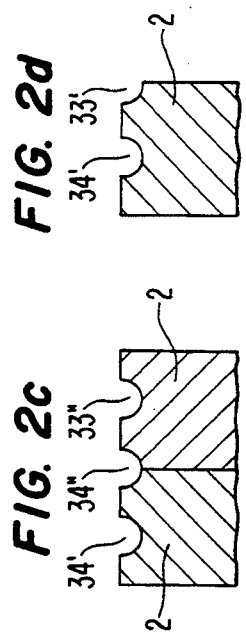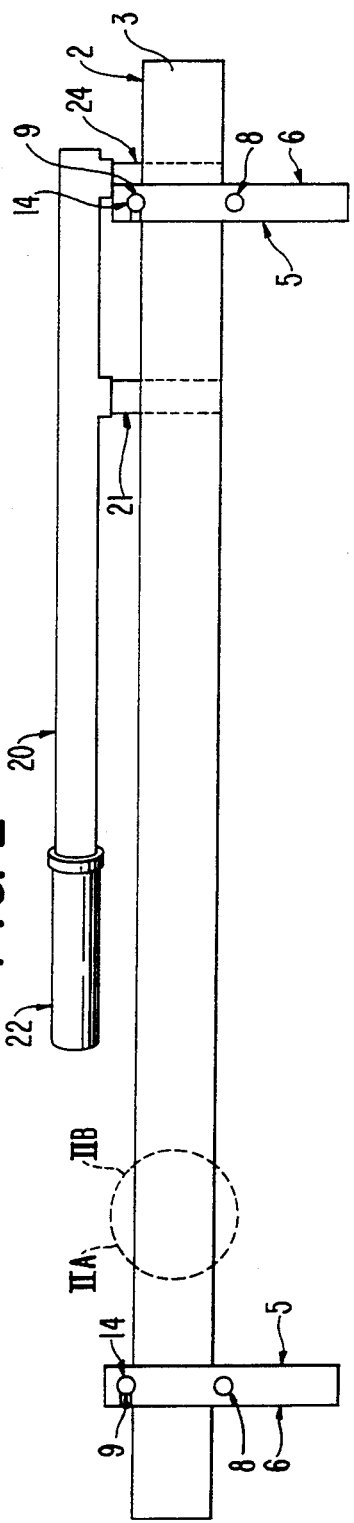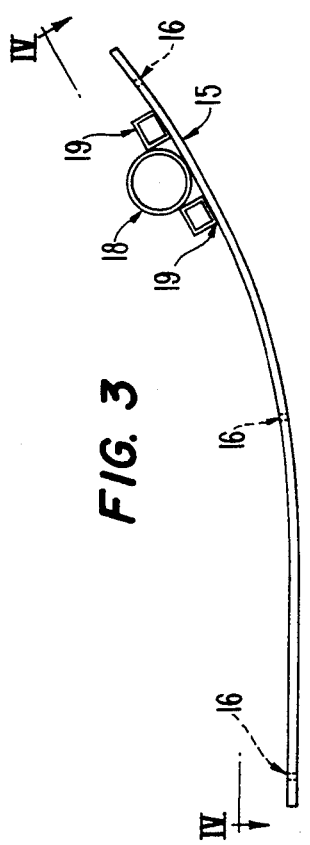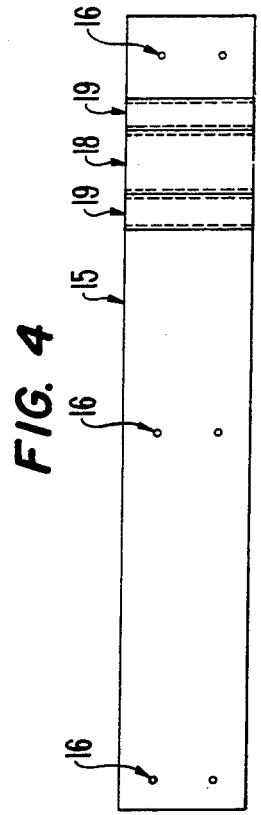

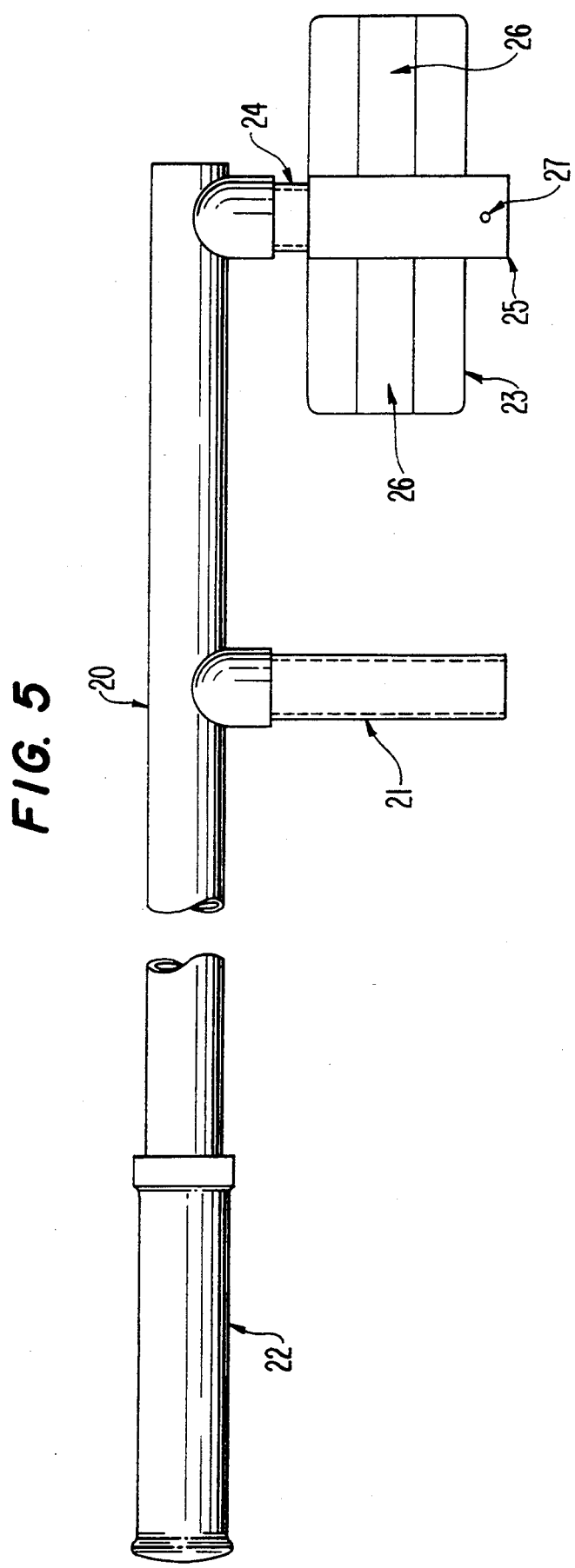

DEVICE FOR BENDING COAXIAL CABLE

BACKGROUND OF THE INVENTION

1. Field of the Invention

The present invention relates to a lightweight and easy to operate device for bending expansion loops in cable—particularly coaxial cable—which must be bent in a manner which reduces stressing, cutting or wrinkling of the cable so as to prevent signal leakage from the cable.

2. Description of the Related Art

Devices for bending expansion loops in coaxial cables are known. For example, U.S. Pat. Nos. 3,824,835, 3,855,838, and 4,569,219 show devices used to form expansion loops in a length of coaxial cable. These patents describe the reasons why expansion loops are necessary in coaxial cable: to compensate for temperature expansion and contraction of the cable when it is suspended from poles by way of a support cable (sometimes also referred to as a "lasher cable"). The devices for bending expansion loops shown in each of these patents, however, require complicated mechanisms for forming the expansion loops, including ratcheted or geared central bending shoes. The complicated nature of the bending mechanisms shown in these patents, and the structural rigidity of the frame needed to support such mechanisms, can result in these devices being undesirably heavy. Such devices can weigh up to 30 pounds, which makes them difficult to maneuver by an operator working at the top of a pole, and therefore raises the risk that the operator will instead bend the loop by hand. Hand-bent expansion loops increase the chances that the cable will be damaged during bending, and that the loop will be non-uniform and therefore exhibit undesirable expansion and contraction characteristics. In addition, in many of the type of devices shown in these patents, it is necessary for the operator to hold the bender in one hand while bending the cable with the other. This procedure increases the risk that the bender will be dropped, endangering other workers, and makes the bending operation itself much more difficult. In addition, in the prior art devices described above, the complicated nature of the bending mechanisms made the devices difficult to operate, and could lead to premature operator fatigue—again, increasing the risk that the bending device will not be used by an operator and that an improper or damaged expansion loop will be made.

Another type of prior art device which has been used to produce expansion loops in coaxial cable is a simple frame or form. U.S. Pat. No. 4,569,219, at col. 1, lines 35–41. describes a wooden form with an arcuate surface around which a cable is bent by hand. A device of this type, manufactured of plastic and containing a single groove on the arcuate surface for receiving the coaxial cable as it is bent and a groove on the top surface for aligning the expansion loop with the support cable, has been sold under the trade name MULLEN BENDER ®. As discussed in U.S. Pat. No. 4,569,219, devices of this type—although lightweight—are disadvantageous because of the considerable manual effort required to bend the cable around the form to produce an expansion loop. In addition, this type of device requires the operator to support the form in one hand while at the same time bending the cable around the form with the other hand. This operation makes use of such a form difficult for a single operator, particularly one operating at a great height, and increases the chances of premature operator fatigue and that the frame or form will be dropped.

SUMMARY OF THE INVENTION

The present invention is a cable bender which allows a coaxial cable worker to bend up to a one-inch diameter coaxial cable into an expansion loop, while working at heights of 20–30 feet up a pole. The bender allows the operator to produce uniform bends in the expansion loop, and places minimum strain on the cable, to thereby prevent signal leakage which can result from a stressed, cut or wrinkled outer surface of the cable. The present invention also aids in the use of the support cable as a support during bending, and aids in proper spacing of the coaxial cable from the support cable. The expansion loops in the coaxial cable formed by the present invention can be more easily and safely offset from the support pole.

The present invention is lightweight—weighing less than ten pounds—thereby making it easier to use at great heights and decreasing the chances that the operator will prematurely fatigue. The cable bender of the present invention is light enough to be lifted on a hand line, and may be secured and supported in place by way of support clamps which lock the cable bender on the support cable during operation. Once locked on the support cable, the bender of the present invention can slide to the position where the expansion loop is to be formed in the coaxial cable. As a result, both of the operator's hands are available for the bending operation, reducing operator fatigue and decreasing the chance that the bender will be dropped. In addition, the fittings to the frame of the present bender are easily removable from the frame, so that they may be simply and economically replaced on a new, inexpensive frame when the old frame becomes worn or broken.

In the present invention, a pivoted handle having on one end a bending shoe is used to bend the cable against a shaped frame. The pivoted handle increases the leverage available to bend the cable, thereby reducing the force necessary to make the expansion loop. The pivoted handle allows the operator to utilize the mechanical advantage of a lever effect, and also allows the operator to feel the amount of pressure being applied to thereby reduce the chances of the cable being crimped, crushed or cut by the bending shoe. Because the bending shoe is rotatable 360° around the handle, and because the handle is removably mountable in both pivot tubes on the frame, the handle is easily switched from one end of the bender to the other, to create the both bends necessary to produce a complete expansion loop.

BRIEF DESCRIPTION OF THE DRAWINGS

Other objects and advantages of the invention will be apparent from the specification and claims, when considered in connection with the attached sheets of drawings, illustrating one form of the invention, wherein like characters represent like parts and in which:

FIG. 2 shows a top view of the embodiment of FIG. 1;

FIGS. 2a and 2b show detail views of the groove structure of, respectively, a double-frame and a single-frame cable bending device of the present invention;

FIGS. 2c and 2d show cross-sectional detail views of the groove structure of, respectively, a double-frame and a single-frame cable bending device of the present invention:

FIG. 3 shows a side view of the internal pivot and support structure of the embodiment of FIG. 1;

FIG. 4 shows a top view of the internal pivot and support structure of FIG. 3;

FIG. 5 shows a top view of the handle assembly of the embodiment of FIG. 1;

DETAILED DESCRIPTION OF THE INVENTION

Figure 1:
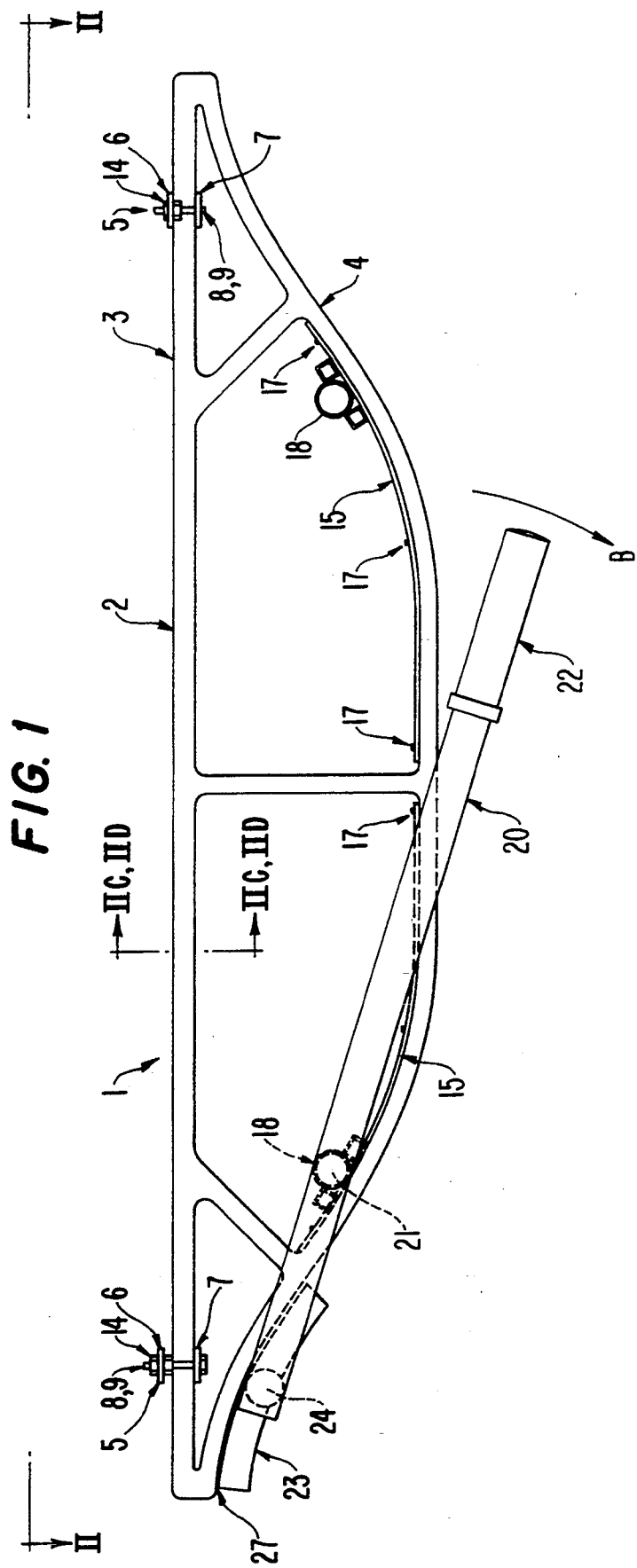
FIG. 1 shows a side view of one embodiment of the cable bending device of the present invention.

FIG. 1 shows a side view of the cable bending device 1 of the present invention. The cable bending device 1 includes a frame element 2, which has an flattened upper portion 3 and an arcuate lower portion 4. As discussed below, the frame element 2 can be of the type sold under the trade name MULLEN BENDER ®, and can consist of a single frame of this type, or two frames of this type connected side-by-side. The frame 2 should be constructed of a rigid but lightweight material, such as a thermoplastic material or metals such as aluminum, aluminum alloys or chrome-molybdenum. Other materials such as steel or ceramics can also be used to construct the frame 2. As is also discussed below, frame 2 has a groove or series of grooves around its outer surface, which are used to both support the coaxial cable as it is being bent, and to secure the frame 2 to a support cable during use of the cable bender 1.

Figure 9:
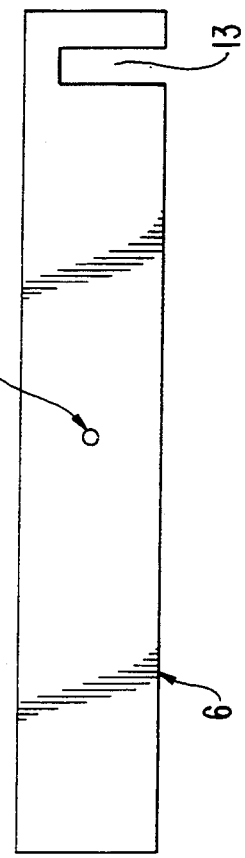
FIG. 9 shows a top view of the top bracket of the support cable clamp of FIG. 8.
Figure 8:
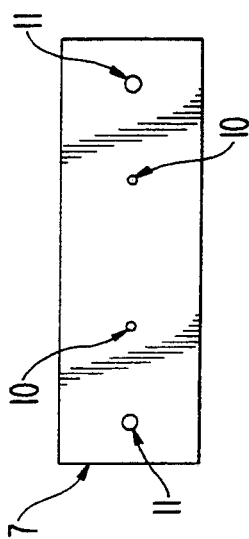
FIG. 8 shows a top view of the bottom bracket of the support cable clamp of the embodiment of FIG. 1.

Attached to the flattened upper portion 3 of frame 2 are a pair of securing clamps 5 for securing cable bender 1 to a support cable during use. Securing clamps 5 are constructed using an upper 6 and a lower 7 bracket (detail views of upper 6 and lower 7 brackets are shown in FIGS. 8 and 9), as well as a pivot 8 and a retention 9 bolt or pin. Lower bracket 7, which acts as a retaining bracket, includes securing holes 10, through which bolts or rivets can be used to secure lower bracket 7 to the underside of flattened upper portion 3 of frame 2. Lower bracket 7 also includes clamping holes 11, through which pivot 8 and retention 9 bolt or pin are secured by any conventional means—e.g. threaded nuts and washers. Upper bracket 6 includes a pivot hole 12 and a retention slot 13. Upper bracket 6, which acts as a securing bracket, is pivotally secured to the outer side of flattened upper portion 3 of frame 2 by passing pivot bolt or pin 9 through pivot hole 12 and securing upper bracket 6 pivotally on pivot bolt or pin 9 by any conventional means—e.g. threaded nuts and washers. Upper bracket 6 is secured in a clamping position (as shown in FIG. 2) by pivoting upper bracket 6 until retention slot 13 slides under a retention head 14 on retention bolt 9. In this position, a support cable can be secured between upper bracket 6 and a groove 34' or 34'' (FIGS. 2a-2d) on flattened upper portion 3 of frame 2. In this way, cable bender I can be supported during operation by a support cable so that the operator is free to use his or her hands to manipulate the coaxial cable to be bent and the bending mechanism described below. This arrangement also allows the cable 1 to be slid into position along the support cable.

Figure 7:
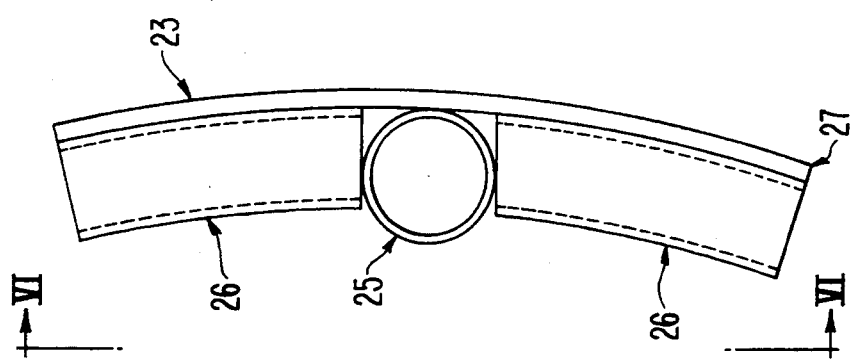
FIG. 7 shows a side view of the bending shoe of FIG. 6.
Figure 6:
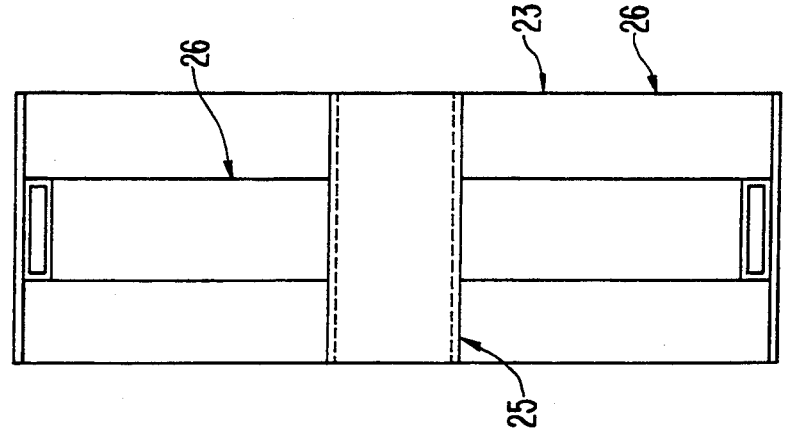
FIG. 6 shows a top view of the bending shoe of the embodiment of FIG. 1.

FIGS. 3 and 4 show side and top views, respectively, of the internal pivot and support structure 15 of the cable bender 1. As shown in FIG. 1, a structure 15 is secured, preferably using bolts or rivets 17 passing through holes 16, to both ends of the underside of arcuate lower portion 4. Although shown as a separately secured structure, structure 15 could alternatively be formed as one piece with frame 2—for example, the frame 2 and structure 15 could be sand cast as a one piece unit in a single mold. Structure 15 includes a handle pivot tube 18, generally constructed of a tubular member which may be supported by suitable handle tube stiffening brackets 19. Handle pivot tube 18 pivotally and releasably retains a bending handle 20 (shown in detail in FIG. 5). Handle pivot tube 18 can include a bushing constructed of bronze or any other suitable material. Bending handle 20 includes a handle pivot shaft 21, shaped so as to be pivotally received within handle pivot tube 18. At one end of bending handle 20 is a handle grip 22—generally made of a conventional rubber or thermoplastic sleeve slipped over the bending handle 20—and at the other end of pivot handle 20 is a pivotally mounted bending shoe 23 (shown in detail in FIGS. 6 and 7). Bending shoe 23 is pivotally mounted to bending handle 20 by means of a shoe pivot shaft 24 rigidly attached to bending handle 20. Bending shoe 23 includes a shoe pivot tube 25, generally constructed of a tubular member shaped to pivotally receive shoe pivot shaft 24, which may be supported by suitable shoe tube stiffening brackets 26. Shoe pivot tube 25 can include a bushing constructed of bronze or any other suitable material. A suitable set screw 27 or other known retaining device can be used to secure bending shoe 23 on bending handle 20 so that it may pivot, but cannot slide off of shoe pivot shaft 24. The underside 26 of bending shoe 23 can be constructed of a rubber, thermoplastic or other non-metallic material and attached to bending shoe 23. Constructing underside 26 of a relatively soft material prevents bending shoe 23 from crimping or cutting the coaxial cable during bending. The underside 26 of bending shoe 23 should be of an arcuate shape which fits against the arcuate shape of arcuate lower portion 4. The remainder of the bending handle 20 structure should be constructed of a lightweight metallic material such as aluminum, aluminum alloys or chrome-molybdenum, and generally should be of a hollow shape to reduce weight without sacrificing strength.

The frame 2 of the cable bender 1 can be of two different configurations: a single-frame bender or a double-frame bender. FIGS. 2a-2d show generally these two types of configurations, with FIGS. 2a and 2c showing a double-frame bender, and FIGS. 2b and 2d showing a single-frame bender. The double-frame bender of FIGS. 2a and 2c is generally constructed by securing two single frames 2 side-by-side. As shown in FIGS. 2b and 2d, the single-frame bender has a full groove 34' and a half groove 33' on the outer surface of flattened upper portion 3. As shown in FIGS. 2a and 2c, the double-frame bender has three full grooves 34', 34'' and 33'', with full groove 34'' being formed by the cooperation between the two half grooves 33' on the single frames as they are placed side-by-side. Although FIGS. 2a-2d show the configuration of the grooves on the outer surface of the flattened upper portion 3, the outer surface of the arcuate lower portion 4 has grooves of a similar configuration, depending on whether a single- or double-frame structure is used. In addition, the double-frame structure shown in FIGS. 2a and 2c could be constructed, in the configuration shown, of a unitary molded part instead of by securing two single-frame units side-by-side.

In operation, an operator first secures the cable bender 1 to a support cable by fitting the support cable into either groove 34' (in a single-frame bender) or groove 34" (in a double-frame bender), and then securing cable bender 1 to the support cable by pivoting both upper brackets 6 until retention slot 13 slides under retention head 14 on retention bolt 9. The operator then slides the cable bender 1 down the support cable until it is in a position where an expansion loop is to be formed in the coaxial cable. The coaxial cable is fitted into a groove on the outer surface of the arcuate lower portion 4, and the bending handle 20 is pivoted in the direction B shown in FIG. 1. As a result of this movement of bending handle 20, the coaxial cable is bent against, and assumes the shape of one side of arcuate lower portion 4. The bending handle 20 is then slipped out of the handle pivot tube 18 in which it is initially retained, and slipped into the handle pivot tube 18 on the other end of the cable bender 1. The same procedure outlined above is then repeated, whereby the coaxial cable is held in the groove on the outer surface of the arcuate lower portion 4, and the bending handle 20 is pivoted in the direction B. As a result, the cable is bent into the shape of the entire length of the arcuate lower portion 4. The cable bender 1 may thereafter be slid down the support cable or removed from the support cable. The coaxial cable, with expansion loop in place, may then be secured along the length of the support cable until the next expansion loop is needed to be formed. The cable bender 1 then may be either slid down the support cable to the next location where a bend will be made, or may be transported to that location after being taken off the support cable.

While the form of apparatus herein described constitutes a preferred embodiment of the invention, it is to be understood that the invention is not limited to this precise form of apparatus, and that changes may be made therein without departing from the scope of the invention.

We claim:

1. A device for bending a cable into an arcuate form including a frame member having an arcuate form, said device comprising:
   at least one securing clamp for clamping said device to a suspended cable, said at least one securing clamp comprising:
   a securing bracket;
   a pivot member for pivotally securing said securing bracket to said frame; and
   a securing member for retaining said securing bracket in a locked position over said frame, in such a manner that a space exists between said securing bracket and said frame into which space said suspended cable fits, to thereby secure said frame to said suspended cable.

2. The device of claim 1, further comprising:
   a retaining bracket fixedly secured to said frame, said pivot member and said securing member being fixedly secured to said retaining bracket.

3. The device of claim 2, wherein:
   said pivot member comprises a pin or bolt and said securing member comprises a pin or bolt.

4. The device of claim 3, wherein:
   said securing member further comprises a retention head, said securing bracket comprising a retention slot, whereby in said locked position said securing member is within said retention slot and said retention slot is adjacent said retention head.

5. The device of claim 1, wherein:
   said pivot member comprises a pin or bolt and said securing member comprises a pin or bolt.

6. The device of claim 1, further comprising:
   a second securing clamp spaced from said at least one securing clamp.

7. A device for bending a cable into an arcuate form comprising:
   a closed frame member having around its periphery a first surface and a second, arcuate surface;
   first and second pivots connected to said frame member inwardly of and adjacent said second arcuate surface; and
   a bending handle pivotally securable in one of said first or said second pivots, said bending handle including a bending shoe pivotally secured to one end of said bending handle and disposed adjacent said arcuate surface in one position of said bending handle and disposed away from said arcuate surface in another position of said bending handle, whereby pivoting movement of said bending handle in said first pivot or said second pivot moves said bending shoe towards said arcuate surface, to thereby bend said cable against and into the shape of said arcuate surface at said one position of said bending handle.

8. The device for bending cable of claim 7, further comprising:
   a groove in said first surface and a groove in said second surface.

9. The device for bending cable of claim 7, wherein:
   said bending handle includes a pivot shaft, said pivot shaft being pivotally mountable in either said first pivot or said second pivot.

10. The device for bending cable of claim 7, wherein:
    said bending shoe has a surface of an arcuate form corresponding to a shape of a portion of said second surface.

11. The device for bending cable of claim 7, wherein:
    said frame member comprises two frame elements secured side-by-side.

12. The device for bending cable of claim 11, wherein:
    said first surface contains a plurality of grooves and said second surface contains a plurality of grooves.

13. The device for bending cable of claim 7, wherein:
    said frame member is constructed of a thermoplastic material.

14. The device for bending cable of claim 7, wherein:
    said bending handle is constructed of chrome-molybdenum.

15. The device for bending cable of claim 9, wherein:
    said bending handle includes a grip portion, said pivot shaft being located between said grip portion and said bending shoe.

16. The device for bending cable of claim 7, wherein:
    said first surface is flattened.

17. The device for bending cable of claim 7, wherein:
    said frame member is constructed of a light weight metallic material.

18. A device for bending a cable into an arcuate form comprising:

a closed frame member having around its periphery a first surface and a second, arcuate surface;

first and second pivots connected to said frame member inwardly of and adjacent said second arcuate surface;

a bending handle pivotally securable in one of said first or said second pivots, said bending handle including a bending shoe pivotally secured to one end of said bending handle and disposed adjacent said arcuate surface in one position of said bending handle, whereby pivoting movement of said bending handle in said first pivot or said second pivot moves said bending shoe towards said arcuate surface, to thereby bend said cable against and into the shape of said arcuate surface at said one position of said bending handle;

a first securing clamp, mounted adjacent said first surface, for clamping said device to a suspended cable; and a second securing clamp, spaced from said first securing clamp and mounted adjacent said first surface, for clamping said device to said suspended cable;

wherein said securing clamps comprise:
(a) a securing bracket;
(b) a pivot member for pivotally securing said securing bracket to said frame member; and
(c) a securing member for retaining said securing bracket in a locked position over said first surface, whereby a space exists between said securing bracket and said first surface into which space said suspended cable fits, to thereby secure said device to said suspended cable.

19. A device for bending a cable into an arcuate form comprising:

a closed frame member having around its periphery a first surface and a second, arcuate surface;

at least one pivot connected to said frame member; and a bending handle pivotally securable in said at least one pivot, said bending handle including a bending shoe pivotally secured to one end of said bending handle and disposed adjacent said arcuate surface in a first position of said bending handle and disposed away from said arcuate surface in a second position of said bending handle, whereby pivoting movement of said bending handle in said at least one pivot moves said bending shoe towards said arcuate surface, to thereby bend said cable against and into the shape of said arcuate surface at said one position of said bending handle, said bending shoe moving towards said arcuate surface to thereby bend said cable at at least two locations along a length of said second arcuate surface.

20. The device for bending cable of claim 19, further comprising:

a groove in said first surface and a groove in said second surface.

21. The device for bending cable of claim 19, wherein:

said bending handle includes a pivot shaft, said pivot shaft being pivotally mountable in said at least one pivot.

22. The device for bending cable of claim 19, wherein:

said bending shoe has a surface of an arcuate form corresponding to a shape of a portion of said second surface at said at least two locations.

23. The device for bending cable of claim 19, wherein:

said frame member comprises two frame elements secured side-by-side.

24. The device for bending cable of claim 23, wherein:

said first surface contains a plurality of grooves and said second surface contains a plurality of grooves.

25. The device for bending cable of claim 19, wherein:

said frame member is constructed of a thermoplastic material.

26. The device for bending cable of claim 19, wherein:

said bending handle is constructed of chrome-molybdenum.

27. The device for bending cable of claim 21, wherein:

said bending handle includes a grip portion, said pivot shaft being located between said grip portion and said bending shoe.

28. The device for bending cable of claim 19, wherein:

said frame member is constructed of a light weight metallic material.

* * * * *